United States Patent
Kawabata (10) Patent No.: US 10,542,181 B2
(45) Date of Patent: Jan. 21, 2020

(54) DATA PROCESSING SYSTEM, DATA PROCESSING APPARATUS, SERVER, AND RECORDING MEDIUM

(71) Applicant: KONICA MINOLTA, INC., Chiyoda-ku, Tokyo (JP)

(72) Inventor: Hiroyuki Kawabata, Kawanishi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/979,132

(22) Filed: May 14, 2018

(65) Prior Publication Data

US 2018/0359390 A1    Dec. 13, 2018

(30) Foreign Application Priority Data

Jun. 8, 2017    (JP) .................................. 2017-113627

(51) Int. Cl.
*H04N 1/44* (2006.01)
*G06F 9/54* (2006.01)
(Continued)

(52) U.S. Cl.
CPC ........... *H04N 1/4426* (2013.01); *G06F 9/541* (2013.01); *G06F 21/629* (2013.01); *H04L 67/22* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 8,055,752 B1* | 11/2011 | Fong ................. | H04N 1/00323 702/182 |
| 2005/0187941 A1* | 8/2005 | Kanasaki ........... | H04N 1/00464 |

(Continued)

FOREIGN PATENT DOCUMENTS

| CN | 104461623 A | 3/2015 |
|---|---|---|
| JP | 2015138513 A | 7/2015 |

OTHER PUBLICATIONS

English translation of Shingo, JP 2015-176383 (Year: 2015).*
(Continued)

*Primary Examiner* — Mohammad H Ghayour
*Assistant Examiner* — Pawan Dhingra
(74) *Attorney, Agent, or Firm* — Holtz, Holtz & Volek PC (57) ABSTRACT

A data processing system includes a data processing apparatus and a server. The server stores a first and second application, the first application to be used by the data processing apparatus after being installed onto the data processing apparatus, the second application corresponding to the first application. The data processing apparatus includes: a display that displays an HTML-based operation screen of the second application on a Web browser, the operation screen being available from the server; and a main body that executes processing. The server includes a processor that offers an API when an instruction to execute processing is given via the operation screen displayed on the display, the API to be used by the second application such that the main body executes processing as instructed. The data processing apparatus further includes a processor that interprets the API and that makes the main body execute processing corresponding to the API.

34 Claims, 8 Drawing Sheets

(51) Int. Cl.
*H04L 29/06* (2006.01)
*H04L 29/08* (2006.01)
*G06F 21/62* (2013.01)

(56) References Cited

U.S. PATENT DOCUMENTS

2010/0268770 A1 10/2010 Kanasaki
2015/0172378 A1 6/2015 Kanasaki

OTHER PUBLICATIONS

Extended European Search Report (EESR) dated Jul. 31, 2018 issued in counterpart European Application No. 18175989.5.
Chinese Office Action (and English language translation thereof) dated Aug. 2, 2019 issued in counterpart Chinese Application No. 201810566175.7.

* cited by examiner

| | Trial Version App Presently Used | Other Available Trial Version Apps |
|---|---|---|
| User 1 | AppC1<br>(URL:http://·····) | AppD1,AppE1····· |
| User 2 | AppA1<br>(URL:http://·····)<br>AppC1<br>(URL:http://·····) | AppB1,AppD1····· |
| User 3 | – | AppC1,AppD1····· |
| ⋮ | ⋮ | ⋮ |

DATA PROCESSING SYSTEM, DATA PROCESSING APPARATUS, SERVER, AND RECORDING MEDIUM

The disclosure of Japanese Patent Application No. 2017-113627, filed on Jun. 8, 2017, including description, claims, drawings, and abstract, is incorporated herein by reference in its entirety.

BACKGROUND

Technological Field

The present invention relates to: a data processing system provided with a server and a data processing apparatus such as an image forming apparatus; a data processing apparatus; a server, and a recording medium.

Description of the Related Art

The user of a data processing apparatus such as an image forming apparatus can use a second application corresponding to a first application before downloading the first application from a server and installing it onto the data processing apparatus, as to be described below. Conventionally, for example, the user downloads an extension application from the server and installs it onto the data processing apparatus to enhance a function of the data processing apparatus.

The user downloads and installs an extension application by manipulating a screen of the data processing apparatus. Since a list of extension applications and other information are available from the server, the user can view them by accessing the server. Before installing an extension application, the user may hope to install a trial version application that enables at least one function or similar functions of the extension application, and try out the extension application using the trial version application.

Generally, only a power user e.g. an administrator user of the data processing apparatus is permitted to install applications including trial version applications. Any user is not permitted to install or try out an application without a power user privilege or permission, although he/she is interested in using the application, which is inconvenient.

Japanese Unexamined Patent Application Publication No. 2015-138513 discloses an image forming apparatus that is capable of judging whether or not an application can work on the image forming apparatus before the image forming apparatus installs the application. In the image forming apparatus, an installation package analyzer performs analysis on an installation package, obtains platform information from the installation package, and judges whether or not the application can be successfully installed on the image forming apparatus by comparing the platform information obtained from the installation package to that input by a platform information processor. And if it can be successfully installed, the image forming apparatus installs the application.

Actually, disclosed in Japanese Unexamined Patent Application Publication No. 2015-138513 is a technique of judging whether or not the application can be successfully installed before installing the application, not a technique that allows the image forming apparatus to try out the application using a trial version application.

So, Japanese Unexamined Patent Application Publication No. 2015-138513 does not solve the above-described problem: any user is not permitted to install or try out an application without a power user privilege or permission, although he/she is interested in using the application.

As described above, unless a power user privilege or permission is given, a user of the data processing apparatus cannot use a second application corresponding to a first application, before installing the first application, which is an inconvenience of the conventional technology.

SUMMARY

The present invention, which has been made in consideration of such a technical background as described above, provides: a data processing system that allows a data processing apparatus to use a second application corresponding to a first application without installing the second application onto the data processing apparatus, before installing the first application onto the data processing apparatus; a data processing apparatus; a server; and a recording medium.

A first aspect of the present invention relates to a data processing system including a data processing apparatus and a server being capable of connecting to each other, the server storing a first application and a second application, the first application to be used by the data processing apparatus after being installed onto the data processing apparatus, the second application corresponding to the first application, the data processing apparatus including:

a display that displays an HTML-based operation screen of the second application on a Web browser, the operation screen being available from the server; and a main body that executes data processing, the server including a processor that offers an API when an instruction to execute data processing is given via the operation screen displayed on the display, the API to be used by the second application such that the main body of the data processing apparatus executes data processing as instructed, the data processing apparatus further including a processor that interprets the API offered by the processor of the server and that makes the main body execute data processing corresponding to the API by making a call to the main body.

A second aspect of the present invention relates to a data processing apparatus being capable of connecting to a server, the server storing a first application and a second application, the first application to be used by the data processing apparatus after being installed onto the data processing apparatus, the second application corresponding to the first application, the data processing apparatus including:

a display that displays an HTML-based operation screen of the second application on a Web browser, the operation screen being available from the server;

a main body that executes data processing; and a processor that interprets an API, the API being offered by the server when an instruction to execute data processing is given via the operation screen displayed on the display, the API to be used by the second application such that the main body executes data processing as instructed, and that makes the main body execute data processing corresponding to the API by making a call to the main body.

A third aspect of the present invention relates to a server being capable of connecting to a data processing apparatus, the server including a storage that stores a first application and a second application, the first application to be used by the data processing apparatus after being installed onto the data processing apparatus, the second application corresponding to the first application, wherein a display of the data processing apparatus displays an HTML-based operation screen of the second application, the operation screen being available from the server, the server further including a processor that offers an API when an instruction to execute data processing is given via the operation screen displayed on the display of the data processing apparatus, the API to be used by the second application such that the data processing apparatus executes data processing as instructed.

A fourth aspect of the present invention relates to a non-transitory computer-readable recording medium storing a program for a computer of a data processing apparatus, the data processing apparatus including a main body that executes data processing, the program to make the computer execute:

connecting to a server storing a first application and a second application, the first application to be used by the data processing apparatus after being installed onto the data processing apparatus, the second application corresponding to the first application;

making a display display an HTML-based operation screen of the second application on a Web browser, the operation screen being available from the server connected with the data processing apparatus; and interpreting an API, the API being offered by the server when an instruction to execute data processing is given via the operation screen displayed on the display, the API to be used by the second application such that the main body executes data processing as instructed, and making the main body execute data processing corresponding to the API by making a call to the main body.

A fifth aspect of the present invention relates to a non-transitory computer-readable recording medium storing a program for a processor of a server, the server storing a first application and a second application, the first application to be used by the data processing apparatus after being installed onto the data processing apparatus, the second application corresponding to the first application, the program to make the processor execute:

connecting to the data processing apparatus;

making a display of the data processing apparatus display an HTML-based operation screen of the second application, the operation screen being available from the server 2 being connected to the data processing apparatus; and offering an API when an instruction to execute data processing is given via the operation screen displayed on the display of the data processing apparatus, the API to be used by the second application such that the data processing apparatus executes data processing as instructed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
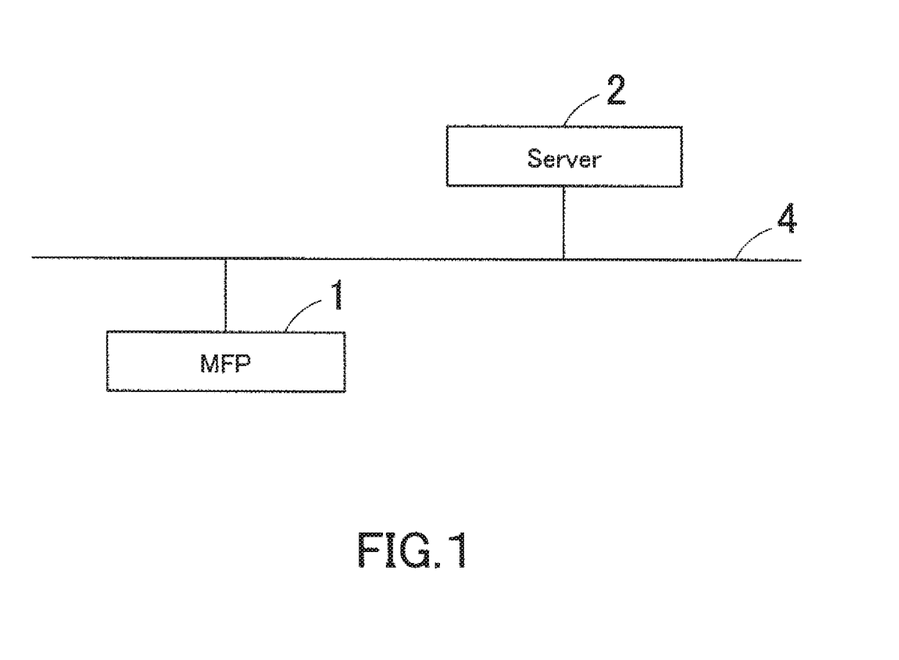
FIG. 1 illustrates a configuration of a data processing system according to one embodiment of the present invention.

FIG. 1 illustrates a configuration of a data processing system according to one embodiment of the present invention. The data processing system is provided with a data processing apparatus 1 and a server 2, both of which are connected to each other through a network 4.

In this embodiment, a multi-function peripheral (MFP) i.e. a multifunctional digital image forming apparatus having various functions such as a copier function, a printer function, a scanner function, and a facsimile function is employed as the data processing apparatus 1. Hereinafter, the data processing apparatus 1 will also be referred to as MFP 1.

Figure 2:
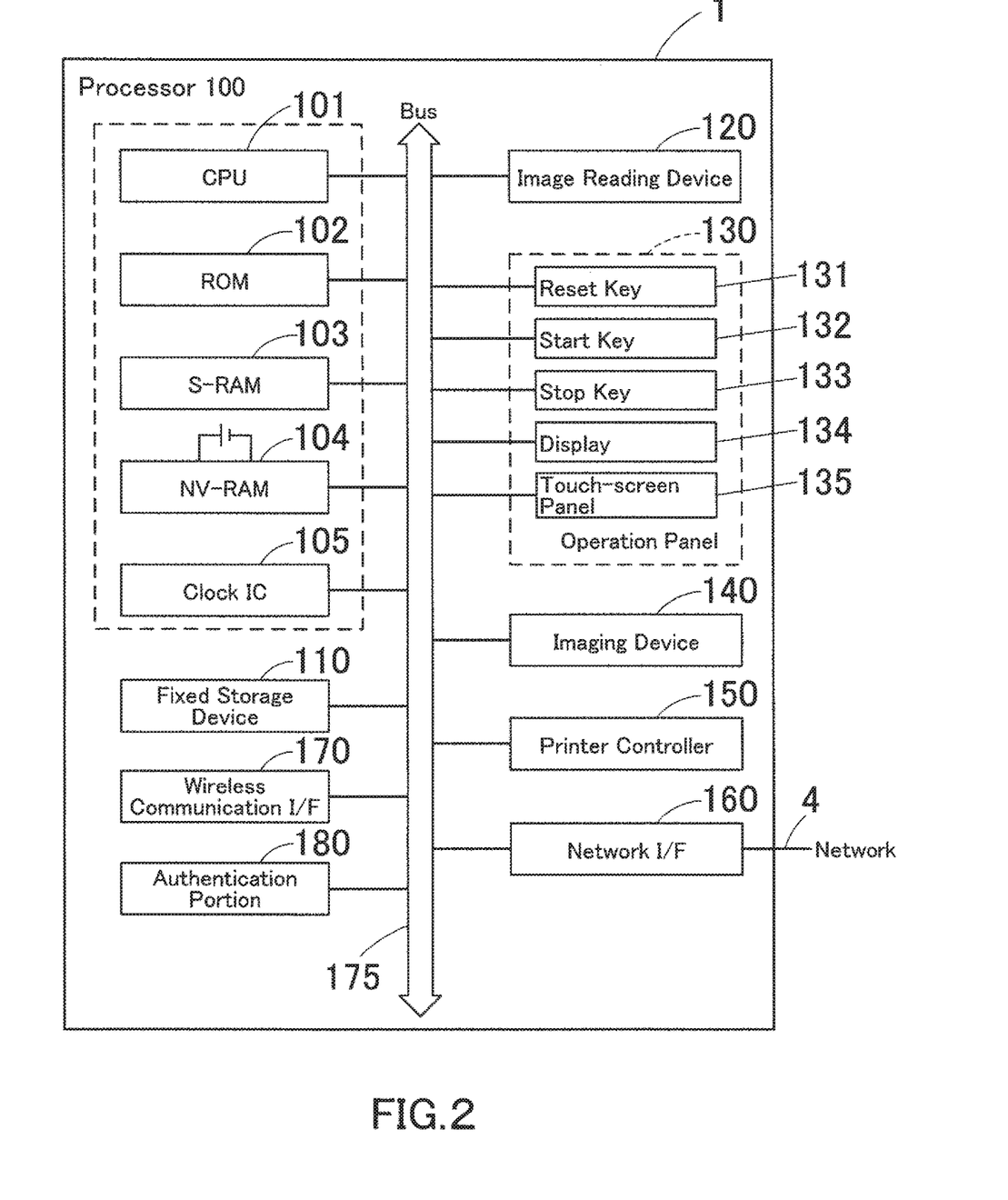
FIG. 2 is a block diagram illustrating a configuration of an image forming apparatus as a data processing apparatus.

FIG. 2 is a block diagram illustrating a configuration of the MFP 1. As illustrated in FIG. 2, the MFP 1 is essentially provided with a processor 100, a fixed storage device 110, an image reading device 120, an operation panel 130, an imaging device 140, a printer controller 150, a network interface (network I/F) 160, a wireless communication interface (wireless communication I/F/) 170, and an authentication part 180, all of which are connected to each other through a system bus 175.

The processor 100 is essentially provided with a central processing unit (CPU) 101, a read-only memory (ROM) 102, a static random access memory (S-RAM) 103, a non-volatile random access memory (NV-RAM) 104, and a clock IC 105.

The CPU 101 controls the MFP 1 in a unified and systematic manner by executing the programs stored on a recording medium such as the ROM 102. For example, the CPU 101 controls the MFP 1 such that its copier function, printer function, scanner function, and facsimile function are implementable. In this embodiment, as will be discussed later, the CPU 101 further performs processing for the use of a trial version application stored on the server 2.

The ROM 102 stores programs for the CPU 101 to execute and other data.

The S-RAM 103 serves as a workspace for the CPU 101 to execute programs, and essentially stores the programs and data to be used by the programs for a short time.

The NV-RAM 104 is a battery backed-up non-volatile memory and essentially stores various settings related to image forming.

The clock IC 105 indicates time and also serves as an internal timer to essentially measure processing time.

The fixed storage device 110 is a hard disk drive, for example, and stores programs and other data of various types. In particular, in this embodiment, the fixed storage device 101 stores monitoring information, a table that records how the trial version applications stored on the server 2 are used by users. The monitoring information will be later described in detail.

The image reading device 120 is essentially provided with a scanner. The image reading device 120 obtains an image by scanning a document put on a platen and converts the obtained image into image data format.

The operation panel 130 allows the user to give an instruction to execute a job to the MFP 1 and to configure various settings of the MFP 1. The operation panel 130 is essentially provided with a reset key 131, a start key 132, a stop key 133, a display 134, and a touch-screen panel 135.

The reset key 131 allows the user to reset the settings. The start key 132 allows the user to start operation, for example, start scanning. The stop key 133 allows the user to stop operation.

The display 134 is comprised of a liquid-crystal display device, for example, and essentially displays messages and various operation screens. The touch-screen panel 135 is disposed on the display screen of the display 134, and senses touch events by the user. The display 134 is further allowed to display HTML-based images from the server 2 via a Web browser.

The imaging device 140 prints on paper image data obtained from a document by the image reading device 120 and a copy image that is formed on the basis of print data received from a terminal apparatus 3.

The printer controller 150 forms a copy image on the basis of print data received by the network interface 160.

The network interface (network I/F) 160 serves as a transmitter-receiver that exchanges data with the server 2 and other external apparatuses through the network 4. The wireless communication I/F 170 is an interface to communicate with external apparatuses using near-field wireless communication technology.

The authentication part 180 obtains the identification information of a user trying to logon, and performs authentication by comparing the identification information to the proof information stored on a recording medium such as the fixed storage device 110. Instead of the authentication part 180, an external authentication server may perform authentication by comparing the identification information to the proof information. In this case, the authentication part 180 performs authentication by receiving a result of the authentication from the authentication server.

The server 2 is comprised of a personal computer. In the configuration shown in FIG. 3, the server 2 is essentially provided with a CPU 210, a ROM 220, a RAM 230, a memory 240, a display device 250, an input device 260, and a network interface (network I/F) 270, all of which are connected to each other through a system bus 280.

Figure 3:
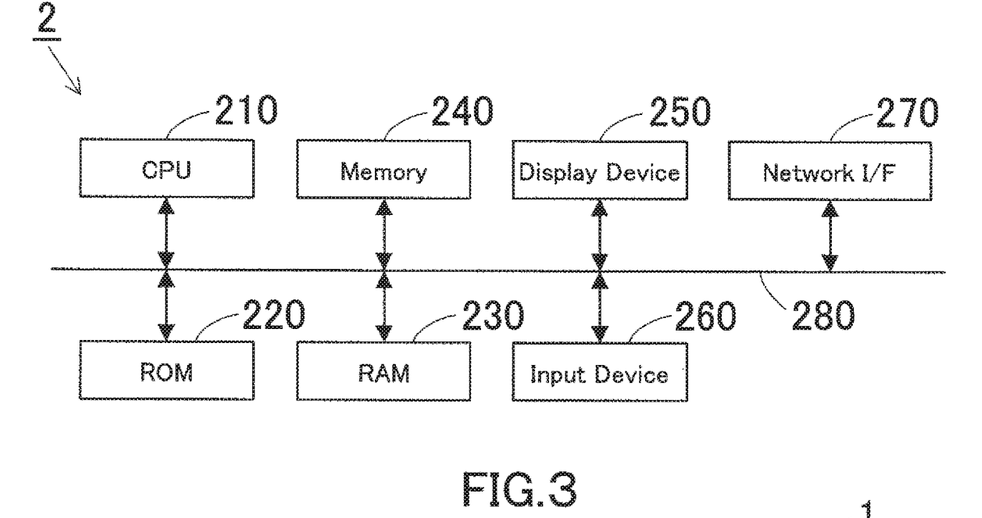
FIG. 3 is a block diagram illustrating a configuration of a server.

The CPU 210 controls the server 2 in a unified and systematic manner by loading the programs stored on a recording medium such as the ROM 220 or the memory 240 into the RAM 230 and executing them. In particular, in this embodiment, the CPU 210 performs processing such that the MFP 1 operates in accordance with a trial version application that is an example of the second application before installing onto the MFP 1 an extension application that is an example of the first application.

The ROM 220 is a recording medium that stores programs to be executed by the CPU 210 and other data.

The RAM 230 is a recording medium that provides a workspace for the CPU 210 to operate in accordance with the programs.

The memory 240 is a recording medium comprised of a hard disk drive, for example, and essentially stores administration data of various types and applications.

The display portion 250 is comprised of a liquid-crystal display, for example, and essentially displays various messages, input screens, and selection screens for the user.

The input device 260 serves for user input, being essentially provided with a keyboard and a mouse.

The network interface 270 serves as a transmitter-receiver that exchanges data with the MFP 1 and other apparatuses through the network 4.

Figure 4:
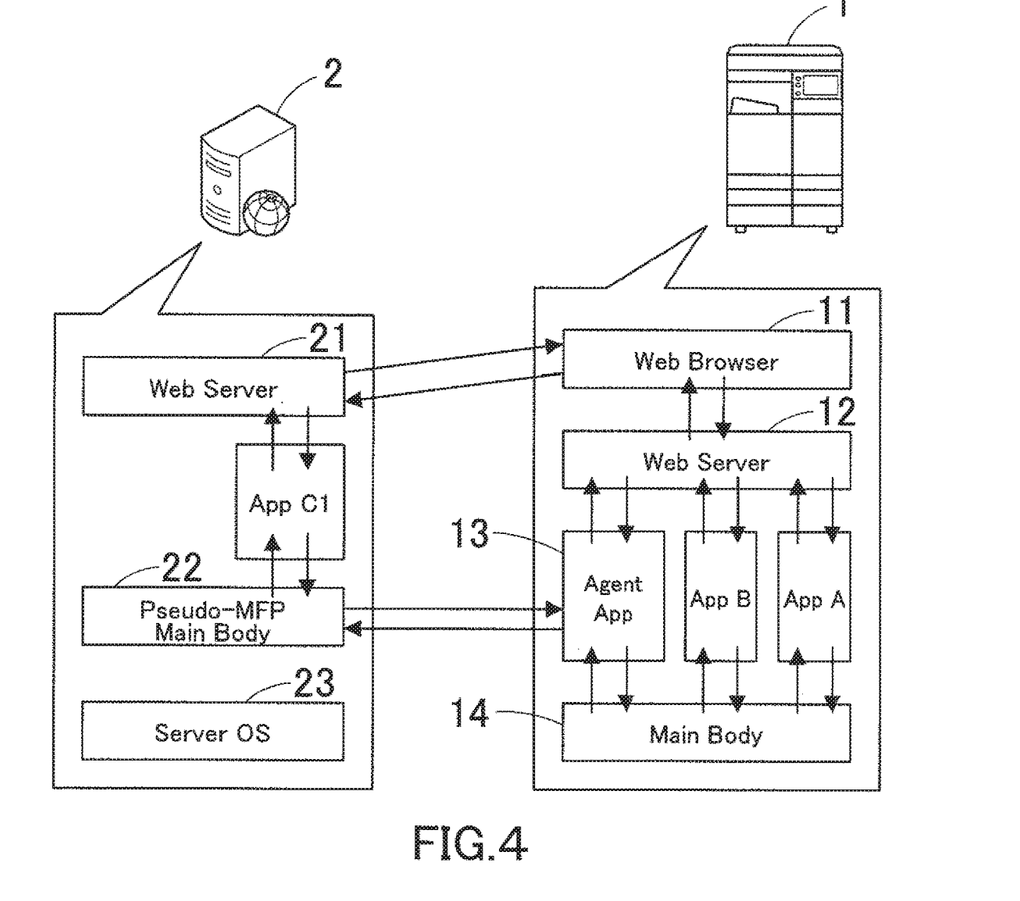
FIG. 4 illustrates software configurations of the image forming apparatus and the server.

FIG. 4 illustrates software configurations of the MFP 1 and the server 2. Hereinafter, applications also will be referred to as simply "apps".

The MFP 1 serves as a Web server 12 and has a Web browser 11 for browsing hypertext markup language (HTML)-based information.

The MFP 1 further has an agent app 13, an app A. and an app B, all of which are preloaded thereon.

The agent app 13 makes a main body 14 of the MFP 1 execute data processing such as a print job based on a trial version app without installing the trial version app onto the MFP 1 from the server 2. Specifically, the agent app 13 interprets a Web application program interface (Web API) that is offered by the server 2 and used such that the main body 14 executes data processing as instructed. The agent app 13 converts the Web API to a system API that the main body 14 can execute, and makes the main body 14 execute data processing by making a system call to the main body 14 accordingly. The agent app 13 further records the use of trial version apps.

The main body 14 is essentially provided with a processor 100, a fixed storage device 110, an image reading device 120, and an imaging device 140. The main body 14 is constituted by hardware and software that enable the functions of the MFP 1; the software includes an operating system (OS). The CPU 101 controls each member constituting the main body 14 of the MFP 1 by operating in accordance with the agent app 13.

The apps A and B are release version apps installed form the server 2 to enhance the printer and scanner function of the MFP 1, for example.

The server 2 serves as a Web server 21 and has a pseudo-MFP main body 22, a trial version app C1, and an operating system (OS) for operating the server 2. The trial version app C1 is for the user to try out a release version app C for enhancing a function of the MFP 1, and enables at least one function or similar functions of a release version app C. The server 2 stores various release version apps and trial version apps corresponding to the release version apps, not shown in the figure. The release version apps include the release version app C and the trial version apps include the trial version app C1. Each trial version app and its corresponding release version app may be built independently, or each trial version app may be built as a part of its corresponding release version app.

When the user of the MFP 1 gives an instruction to execute data processing using the trial version app C1, for example, the pseudo-MFP main body 22 offers a Web API to be used by the trial version app C1 such that the main body 14 of the MFP 1 executes data processing as instructed. The pseudo-MFP main body 22 serves as a part of the CPU 210 while the CPU 210 of the server 2 operates in accordance with a management app, software for offering a Web API, created by the manufacturer or vendor of the trial version app C1.

Figure 5:
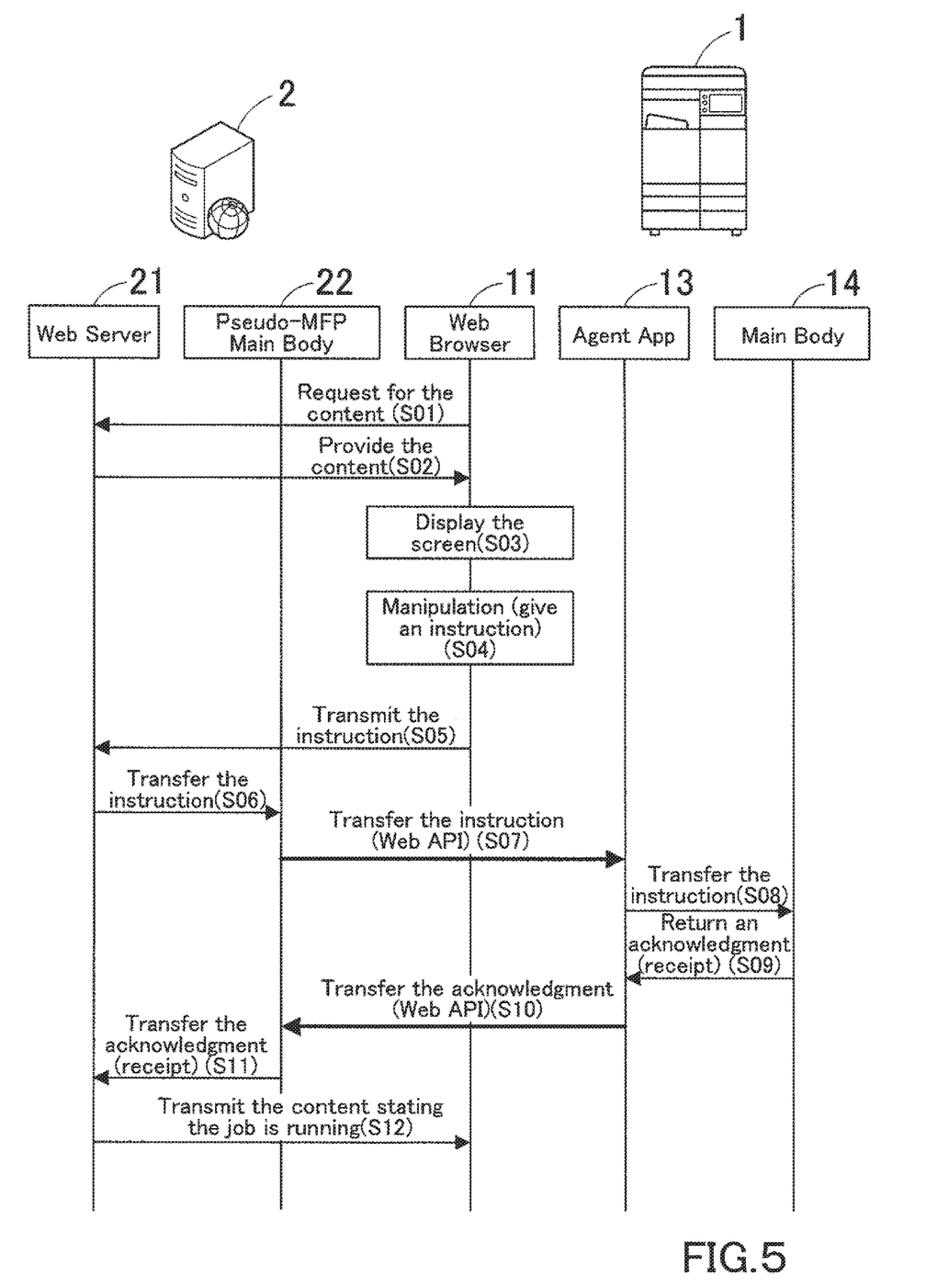
FIG. 5 is a view for reference in describing the operations of the data processing system, to be performed when the user of the data processing apparatus uses a trial version application stored on the server.

FIG. 5 is a view for reference in describing the operations of the data processing system shown in FIG. 1, to be performed when the user of the MFP 1 uses the trial version app C1 stored on the server 2. As for the operation of the server 2, the CPU 210 of the server 2 operates in accordance with a management app, for example, that enables the pseudo-MFP main body 22. As for the operation of the MFP 1, the CPU 101 of the MFP 1 operates in accordance with the agent app 13, for example.

After establishing connections between the MFP 1 and the server 2, the user of the MFP 1 requests the server 2 to provide the content of the trial version app C1 by manipulating the display 134. The MFP 1 then transfers the request for the content of the trial version app C1 to the Web server 21 through the Web browser 11 (Step S01). The Web server 21 provides the HTML-based content of the trial version app C1 to the MFP 1 as requested (Step S02). The MFP 1 displays the received content in the Web browser 11 on the display 134 (Step S03). The content includes the operation screens for the user to use the trial version app C1 on the MFP 1.

The user gives an instruction to execute data processing (a print job, for example) via an operation screen displayed on the display 134 (Step S04). The MFP 1 then transmits the instruction to the Web server 21 through the Web browser 11 (Step S05). The Web server 21 transfers the instruction to the pseudo-MFP main body 22 of the server 2 (Step S06).

Receiving the instruction, the pseudo-MFP main body 22 offers a Web API corresponding to the instruction to the MFP 1 using a general-purpose communication protocol such as simple object access protocol (SOAP) (Step S07). The agent app 13 of the MFP 1 interprets the Web API, converts the Web API to the system functions that the main body 14 can execute, and makes a system call to the main body 14 as a method of transferring the instruction (Step S08).

The main body 14 returns an acknowledgment of receipt of the instruction to the agent app 13 (Step S09) and executes data processing.

Receiving the acknowledgment from the main body 14, the agent app 13 transfers it to the pseudo-MFP main body 22 of the server 2, via the Web API (Step S10). The pseudo-MFP main body 22 transmits a content stating that the job is running, to the Web server 21, as a method of transferring the acknowledgment of receipt of the instruction (Step S11). The Web server 21 transfers the content to the Web browser 11 of the MFP 1 (Step S12). The Web browser 11 of the MFP 1 displays the content stating that the job is running, on the display 134 (Step S13).

As described above, in this embodiment, the MFP 1 displays an HTML-based operation screen of a trial version app (the trial version app C1, for example) corresponding to a release version app (the release version app C, for example), which is available from the server 2, in the Web browser 11 on the display 134. When the user gives an instruction to execute data processing via the operation screen displayed on the display 134, the pseudo-MFP main body 22 of the server 2 offers a Web API to be used by the trial version app C1 such that the main body 14 of the MFP 1 executes data processing as instructed. The agent app 13 of the MFP 1 interprets the Web API offered by the server 2, converts the Web API to the system functions and makes a system call to the main body 14 of the MFP 1. The main body 14 of the MFP 1 then executes data processing accordingly.

The MFP 1 is thus allowed to execute data processing using the trial version app C1 without installing the trial version app C1 onto the MFP 1 itself. This is convenient because the user can try out the release version app C using the trial version app C1 before installing the release version app C, even without a power user privilege or permission.

In this embodiment, the agent app 13 of the MFP 1 allows the administrator user to specify security levels for the trial version apps.

Figure 6:
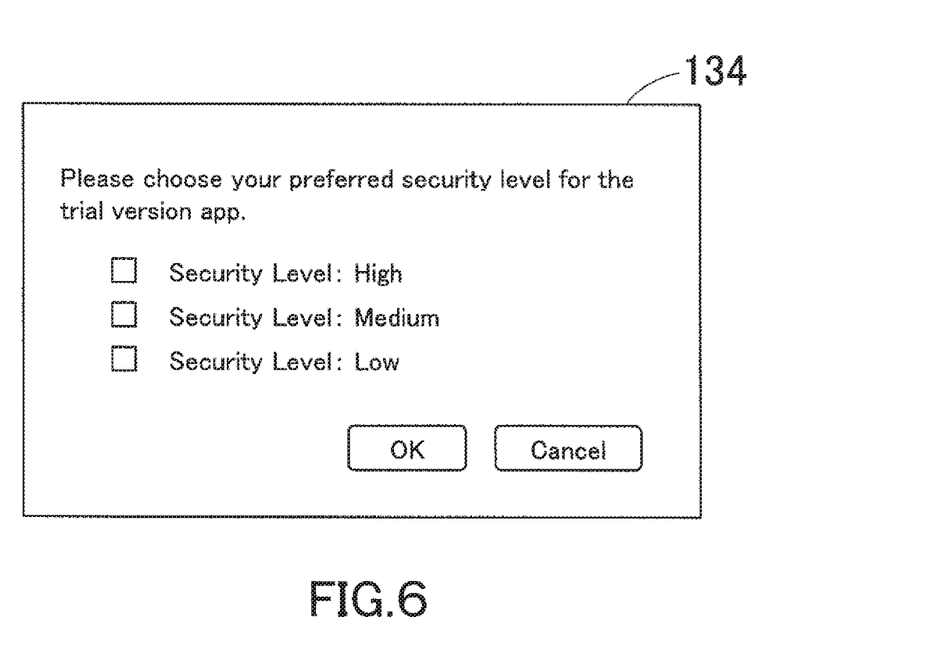
FIG. 6 illustrates a security settings screen.

Specifically, the administrator user presses a "Settings" button in the menu screen displayed on the display 134 in administrator mode and selects the security settings option; then a security settings screen as illustrated in FIG. 6 is displayed on the display 134. The administrator user selects a "high", "medium", or "low" security level and presses an "OK" button; and the selected security level is employed. He/she can return to the previous screen by pressing a "Cancel" button.

In this embodiment, at the "high" security level, any of the information stored on the MFP 1 must not be leaked outside the MFP 1 and the MFP 1 accepts only specific instructions from outside. For example, the security level does not permit the MFP 1 to execute data processing using a trial version app because scanned data would be transferred to the server 2.

At the "medium" security level, a part of the information stored on the MFP 1 (option information, for example) is permitted to be used outside the MFP 1 and the MFP 1 accepts only specific instructions from outside.

At the "low" security level, registered information stored on the MFP 1 (an address book, for example) is also permitted to be used outside the MFP 1 and the MFP 1 accepts almost all instructions from outside.

For example, when the user gives an instruction to execute data processing using a trial version app, the pseudo-MFP main body 22 of the main server 2 offers a Web API. Depending on the security level, the agent app 13 judges whether or not to make a call to the main body 14 of the MFP 1. Only if the security level permits, the agent app 13 makes a call to the main body 14 of the MFP 1.

As described above, the availability of configurable security allow the MFP 1 to use trial version apps securely.

Figure 7:
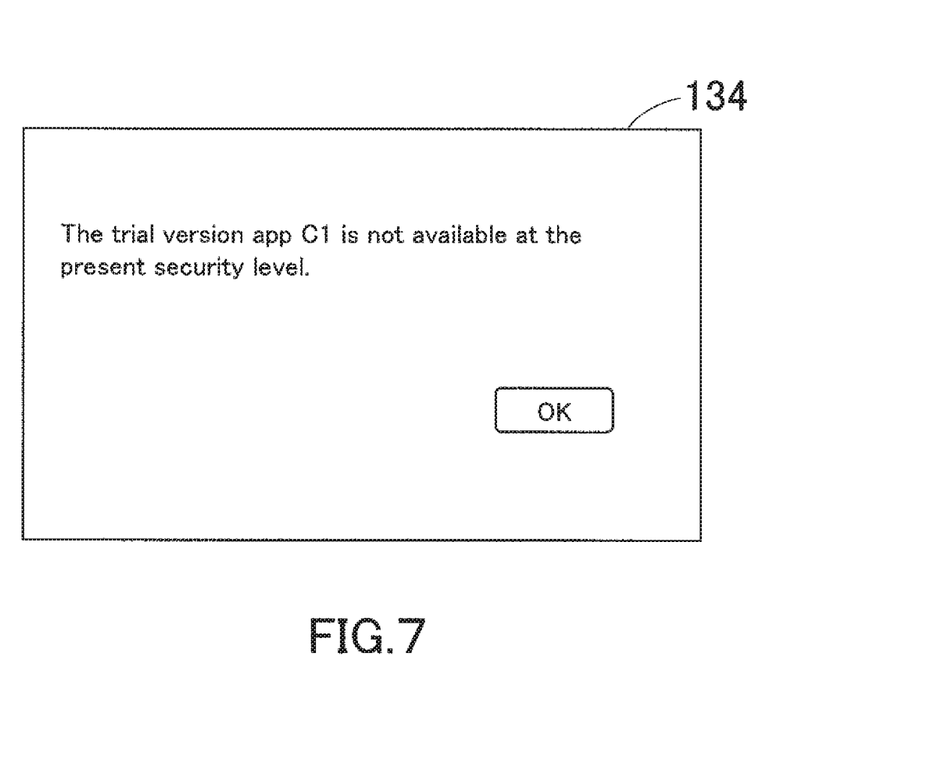
FIG. 7 illustrates a screen with a message stating that the trial version application is not available.

If the security level does not permit, the agent app 13 displays a message stating that the trial version app is not available at the present security level, as illustrated in FIG. 7, on the display 134. By pressing an "OK" button in the screen of FIG. 7, the user can return to a screen to be described with reference to FIG. 10.

Figure 8:
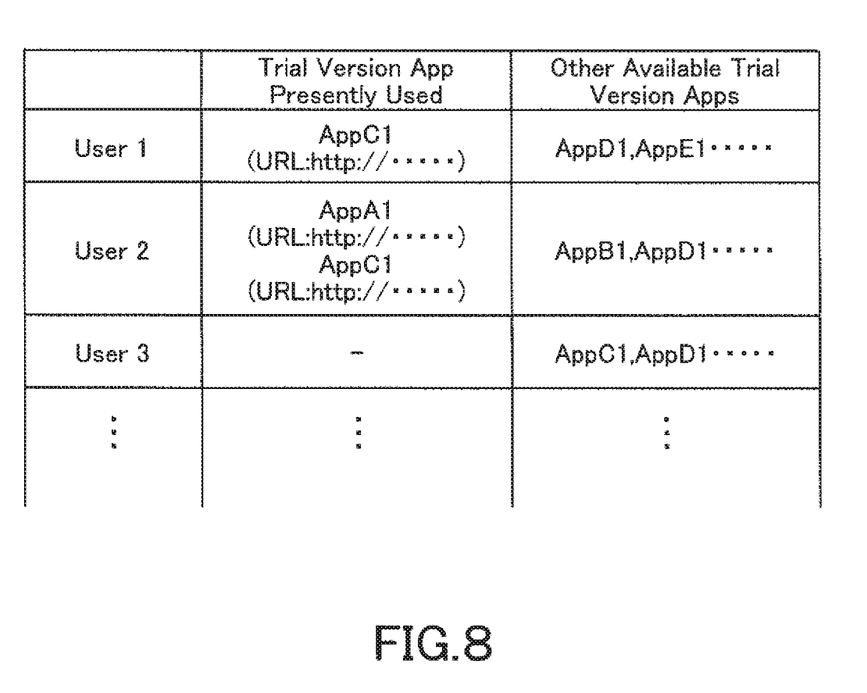
FIG. 8 illustrates monitoring information, a table that records bow the trial version applications (second applications) are used by each user.

Meanwhile, in this embodiment, the agent app 13 of the MFP 1 further serves to record how the trial version apps are used by each user. FIG. 8 illustrates a table that records how the trial version apps stored on the server 2 are used and the uniform resource locators (URLs) and other information of the trial version apps, and each record is associated with a log-on user.

For example, User 1 is presently using the trial version app C1, and other trial version apps such as trial version apps D1 and E1 are also available to the user. The information about the trial version apps available to the user is obtained from the server 21.

User 1 can use a trial version app on the MFP 1 via an operation screen that is created with reference to the table of FIG. 8.

Figure 9:
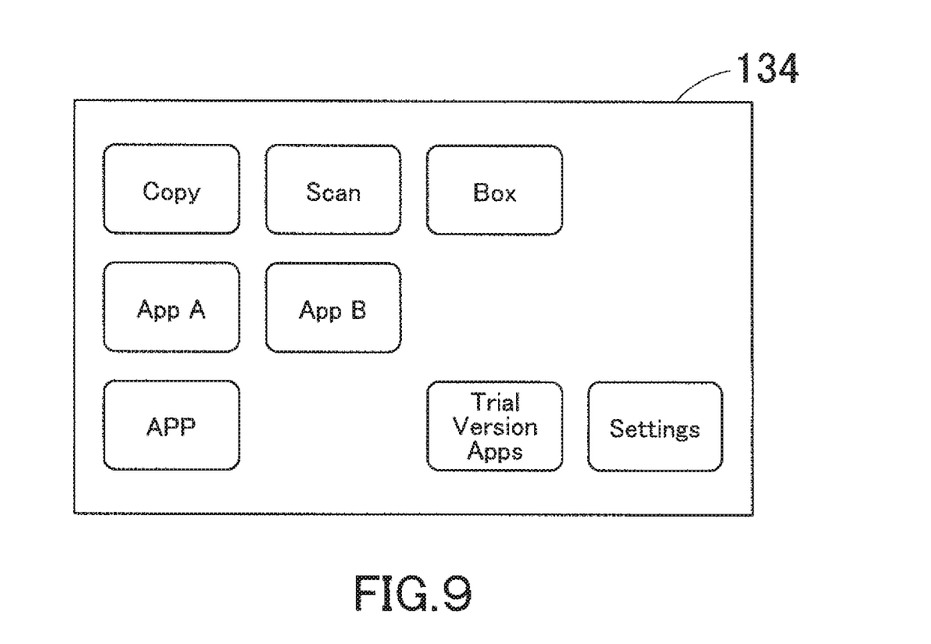
FIG. 9 illustrates an initial menu screen to be displayed on the data processing apparatus.

FIG. 9 illustrates an initial menu screen to be displayed on the display 134 when User 1 is successfully logged on the MFP 1. In the initial menu screen, the following buttons are shown: a "Copy" button for using the copier function; a "Scan" button for using the scanner function; a "Box" button for using the box function; an "App A" and "App B" button for using the release extension apps A and B preloaded on the MFP 1; and a "Trial Ver. App" button for using trial version apps. Since the release extension apps A and B preloaded on the MFP 1 are available to all users, all the users can view the "App A" and "App B" button in their initial menu screens. An "APP" button for using other apps and a "Settings" button for configuring various settings are also shown.

Figure 10:
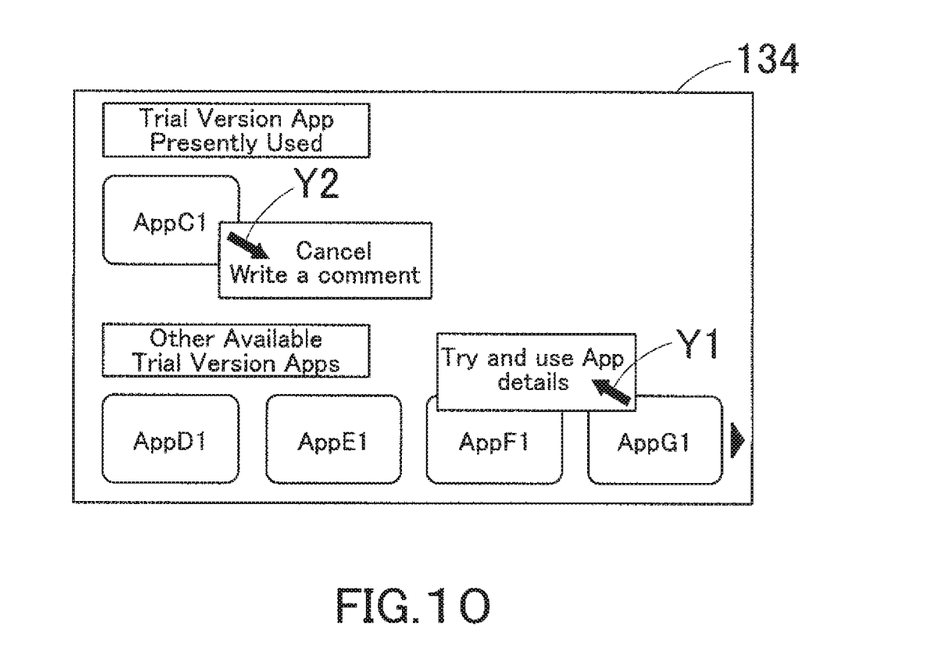
FIG. 10 illustrates a screen to be displayed when the user presses a "Trial Version Apps" button in the screen of FIG. 9.

When User 1 presses the "Trial Version App" button, the agent app 13 creates a screen illustrated in FIG. 10 with reference to the monitoring information, the table of FIG. 8, and displays the screen on the display 134. FIG. 10 illustrates the screen created with reference to the monitoring information on User 1. In this screen, the "App C1" button is shown in the field of the trial version app presently used, and the "App D1", "App E1", "App F1", and "App G1" button are shown in the field of the other available trial version apps.

When User 1 presses the "App G1" button, for example, a "Try and use" option for trying and using a trial version app G1 and a "App details" option are both shown in a pop-up menu as indicated by an arrow Y1 in the screen. When User 1 selects the "Try and use" option, the "App G1" button changes its position into the field of the trial version app presently used. When User 1 selects the "App Details" option, detailed information about the trial version app G1 is shown.

When User 1 presses the "App C1" button in the field of the trial version app presently used, for example, a job is executed using the trial version app C1 in accordance with the procedure illustrated in FIG. 5.

Figure 11:
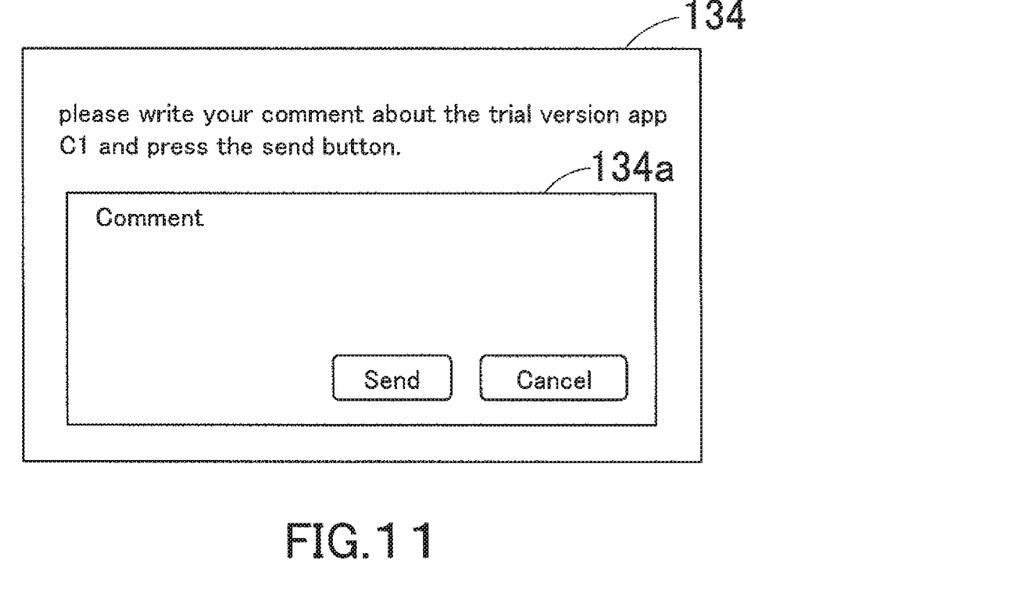
FIG. 11 illustrates a comments entry screen.

When User 1 holds down the "App C1" button in the field of the trial version app presently used, for example, a "Cancel" option for canceling the trial version app C1 and a "Write a comment" option are both shown in a pop-up menu as indicated by an arrow Y2 in the screen. When User 1 selects the "Cancel" option, the "App C1" button changes its position into the field of the other available trial version apps, from the field of the trial version app presently used. When User 1 selects the "Write a comment" option, the screen switches to a comments entry screen as illustrated in FIG. 11. In the comments entry screen, a comments field 134a is shown along with a message "please write your comment about the trial version app C1 and press the send button". When User 1 fills in the comments field 134a and presses the "Send" button, the agent app 13 transfers the comment to the pseudo-MFP main body 22 of the server 2. The pseudo-MFP main body 22 records the comment in a storage area associated with the trial version app C1 so that the manufacturer or vendor of the trial version app C1 can review it. The manufacturer or vendor can make the most of such comments to modify or upgrade the release version app C and develop a new app.

Figure 12:
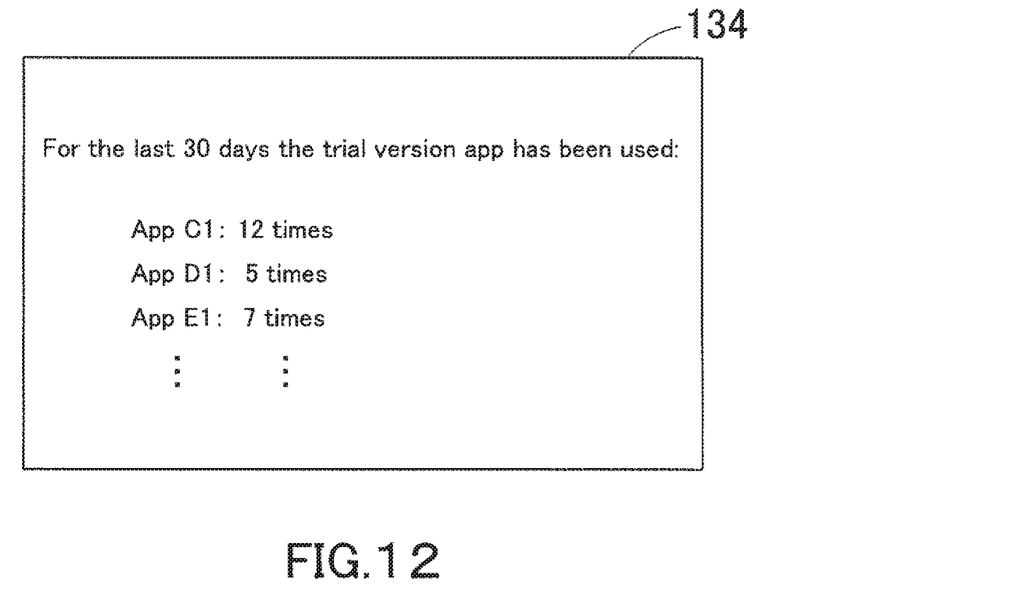
FIG. 12 illustrates a screen showing the numbers of times the trial version applications have been used.

Furthermore, in this embodiment, the agent app 13 of the MFP 1 counts the number of times a trial version app has been used by all users and notifies the administrator user of the MFP 1 of the count. As a method of notifying of the count, the agent app 13 may display a screen as illustrated in FIG. 12 on the display 134 in administrator mode; in this screen, the numbers of times the trial version apps have been used for a certain period of time are shown. Alternatively, the agent app 13 may transmit an email notification to the administrator user's email address. With reference to the notification, the administrator user can judge whether or not to install a release version app corresponding to the trial version app.

Furthermore, in this embodiment, the server 2 records bow the trial version app C1 is used by each MFP 1, as monitoring information. The monitoring information includes a configuration file and usage log of the trial version app C1, for example. After using the trial version app C1, the user of the MFP 1 may install the release version app C onto the MFP 1. In this case, the agent app 13 of the MFP 1 inherits the monitoring information from the server 2 for the release version app C.

As described above, the server 2 records how the trial version app is used by each MFP 1. When the user installs a release version app onto the MFP 1, the MFP 1 inherits the monitoring information from the server 2 for the release version app. The operation of the MFP 1 is thus made simple.

While one embodiment of the present invention has been described in details herein it should be understood that the present invention is not limited to the foregoing embodiment. Although the MFP 1 is an image forming apparatus in this embodiment, it may alternatively be a user terminal, for example.

Although the first app is a release version app for enhancing a function of the MFP 1 and the second app is a trial version app in this embodiment, it should not be understood that the first and second app are limited to a release and trial version app, respectively. The first app is any app to be used by the MFP 1 after being installed onto the MFP 1 and the second app is any app corresponding to the first app and to be used by the MFP 1 without being installed onto the MFP 1.

Although one or more embodiments of the present invention have been described and illustrated in detail, the disclosed embodiments are made for purposes of illustration and example only and not limitation. The scope of the present invention should be interpreted by terms of the appended claims.

What is claimed is:
1. A data processing system comprising:
at least one data processing apparatus; and
a server, wherein the server and the at least one data processing apparatus are capable of connecting to each other, the server stores a first application and a second application, the first application is to be used by the data processing apparatus after being installed onto the data processing apparatus, and the second application corresponds to the first application,
wherein the data processing apparatus comprises:
a display that displays an HTML-based operation screen of the second application on a Web browser, the operation screen being available from the server, wherein the display displays the HTML-based operation screen of the second application in a state in which neither the second application nor the first application are installed onto the data processing apparatus;
and
a main body that executes data processing,
wherein the server comprises:
a processor that offers an API when an instruction to execute data processing is given via the operation screen displayed on the display, the API to be used by the second application such that the main body of the data processing apparatus executes data processing as instructed in the state in which neither the second application nor the first application are installed onto the data processing apparatus, wherein the data processing apparatus further comprises a processor that interprets the API offered by the server and that makes the main body execute data processing corresponding to the API by making a call to the main body in the state in which neither the second application nor the first application are installed onto the data processing apparatus, wherein the second application includes at least one function that is the same as or similar to a function of the first application, whereby the data processing apparatus is capable of executing said at least one function without installing either of the first application or the second application, by execution of the data processing corresponding to the API used by the second application which is stored in the server.

2. The data processing system according to claim 1, wherein:
the data processing apparatus further comprises a security level specifying part that specifies a security level for the second application; and
the processor of the data processing apparatus judges whether or not to make a call to the main body depending on the security level specified by the security level specifying part.

3. The data processing system according to claim 2, wherein the security level is more than one of the following security levels:
a first security level at which any of the information stored on the data processing apparatus must not be leaked outside the data processing apparatus and the data processing apparatus accepts only specific instructions from outside;
a second security level at which a part of the information stored on the data processing apparatus is permitted to be used outside the data processing apparatus and the data processing apparatus accepts only specific instructions from outside; and
a third security level at which registered information stored on the data processing apparatus is also permitted to be used outside the data processing apparatus and the data processing apparatus accepts almost all instructions from outside.

4. The data processing system according to claim 2, wherein, when the second application is not available at the security level specified by the security level specifying part, the processor makes the display show a message stating that the second application is not available.

5. The data processing system according to claim 1, wherein:
the at least one data processing apparatus comprises a plurality of data processing apparatuses;
the server records how the second application is used by each of the plurality of data processing apparatuses, as monitoring information; and
when any of the plurality of data processing apparatuses installs the first application after using the second application, said any of the plurality of data processing apparatuses inherits the monitoring information from the server for the first application.

6. The data processing system according to claim 1, wherein the processor of the data processing apparatus records how the second application is used by each of a plurality of users, and makes the display show the second applications available to each of the plurality of users in a screen.

7. The data processing system according to claim 6, wherein the screen displayed on the display further shows a cancel button for canceling the second application and a try and use button for trying and using the second application, in addition to the second applications available to the users.

8. The data processing system according to claim 1, wherein the processor of the data processing apparatus records an URL of the second application, the URL being associated with a user logged on the data processing apparatus.

9. The data processing system according to claim 1, wherein the processor of the data processing apparatus notifies an administrator user of the data processing apparatus of the number of times the second application has been used.

10. The data processing system according to claim 1, wherein the processor of the data processing apparatus transfers a user comment on the second application to the server, and the server records the comment in a storage area associated with the second application.

11. The data processing system according to claim 1, wherein the at least one function is the same as a function of the first application, whereby the second application enables the function of the first application.

12. The data processing system according to claim 1, wherein:
the server records how the second application is used by the data processing apparatus, as monitoring information, and provides the monitoring information to the data processing apparatus when the data processing apparatus installs the first application; and
the data processing apparatus inherits the monitoring information for the first application installed on the data processing apparatus itself.

13. A data processing apparatus being capable of connecting to a server, wherein the server stores a first application and a second application, the first application is to be used by the data processing apparatus after being installed onto the data processing apparatus, and the second application corresponds to the first application, the data processing apparatus comprising:
a display that displays an HTML-based operation screen of the second application on a Web browser, the operation screen being available from the server, wherein the display displays the HTML-based operation screen of the second application in a state in which neither the second application nor the first application are installed onto the data processing apparatus;
a main body that executes data processing; and
a processor that interprets an API, the API being offered by the server when an instruction to execute data processing is given via the operation screen displayed on the display, the API to be used by the second application such that the main body executes data processing as instructed in the state in which neither the second application nor the first application are installed onto the data processing apparatus, and that makes the main body execute data processing corresponding to the API by making a call to the main body in the state in which neither the second application nor the first application are installed onto the data processing apparatus, wherein the second application includes at least one function that is the same as or similar to a function of the first application, whereby the data processing apparatus is capable of executing said at least one function without installing either of the first application or the second application, by execution of the data processing corresponding to the API used by the second application which is stored in the server.

14. The data processing apparatus according to claim 13, further comprising a security level specifying part that specifies a security level for the second application, wherein the processor judges whether or not to make a call to the main body depending on the security level specified by the security level specifying part.

15. The data processing apparatus according to claim 14, wherein the security level is more than one of the following security levels:
   a first security level at which any of the information stored on the data processing apparatus must not be leaked outside the data processing apparatus and the data processing apparatus accepts only specific instructions from outside;
   a second security level at which a part of the information stored on the data processing apparatus is permitted to be used outside the data processing apparatus and the data processing apparatus accepts only specific instructions from outside; and
   a third security level at which registered information stored on the data processing apparatus is also permitted to be used outside the data processing apparatus and the data processing apparatus accepts almost all instructions from outside.

16. The data processing apparatus according to claim 14, wherein, when the second application is not available at the security level specified by the security level specifying part, the processor makes the display show a message stating that the second application is not available.

17. The data processing apparatus according to claim 13, wherein the processor records how the second application is used by each of a plurality of users, and makes the display show the second applications available to each of the plurality of users in a screen.

18. The data processing apparatus according to claim 17, wherein the screen displayed on the display further shows a cancel button for canceling the second application and a try and use button for trying and using the second application, in addition to the second applications available to the users.

19. The data processing apparatus according to claim 13, wherein the processor records an URL of the second application, the URL being associated with a user logged on the data processing apparatus.

20. The data processing apparatus according to claim 13, wherein the processor notifies an administrator user of the data processing apparatus of the number of times the second application has been used.

21. The data processing apparatus according to claim 13, wherein the processor transfers a user comment on the second application to the server.

22. The data processing apparatus according to claim 13, wherein the at least one function is the same as a function of the first application, whereby the second application enables the function of the first application.

23. The data processing apparatus according to claim 13, wherein:
   the server records how the second application is used by the data processing apparatus, as monitoring information,
   the data processing apparatus receives the monitoring information from the server when the data processing apparatus installs the first application, and
   the monitoring information is inherited for the first application installed on the data processing apparatus, the monitoring information being recorded in the server.

24. A server being capable of connecting to a data processing apparatus, the server comprising:
   a storage that stores a first application and a second application, wherein the first application is to be used by the data processing apparatus after being installed onto the data processing apparatus, the second application corresponds to the first application, and a display of the data processing apparatus displays an HTML-based operation screen of the second application, the operation screen being available from the server, the display displaying the HTML-based operation screen of the second application in a state in which neither the second application nor the first application are installed onto the data processing apparatus,
   a processor that offers an API when an instruction to execute data processing is given via the operation screen displayed on the display of the data processing apparatus, the API to be used by the second application such that the data processing apparatus executes data processing as instructed in the state in which neither the second application nor the first application are installed onto the data processing apparatus,
   wherein the second application includes at least one function that is the same as or similar to a function of the first application, whereby the data processing apparatus is capable of executing said at least one function without installing either of the first application or the second application, by execution of the data processing corresponding to the API used by the second application which is stored in the server.

25. The server according to claim 24, wherein:
   how the second application is used by the data processing apparatus is recorded as monitoring information; and
   the monitoring information is inherited by the data processing apparatus when the data processing apparatus installs the first application after using the second application.

26. The server according to claim 24, wherein a user comment on the second application is recorded in a storage area associated with the second application, the user comment being received from the data processing apparatus.

27. The server according to claim 24, wherein the at least one function is the same as a function of the first application, whereby the second application enables the function of the first application.

28. The server according to claim 24, wherein:
   the processor records how the second application is used by the data processing apparatus, as monitoring information, and provides the monitoring information to the data processing apparatus when the data processing apparatus installs the first application,
   the monitoring information is inherited by the data processing apparatus for the first application installed on the data processing apparatus.

29. A non-transitory computer-readable recording medium storing a program that is executable by a computer of a data processing apparatus, the data processing apparatus comprising a main body that executes data processing, the program being executable by the computer to control the computer to perform functions comprising:

connecting to a server storing a first application and a second application, wherein the first application is to be used by the data processing apparatus after being installed onto the data processing apparatus, and the second application corresponds to the first application;

making a display display an HTML-based operation screen of the second application on a Web browser, the operation screen being available from the server connected with the data processing apparatus, wherein the display is controlled to display the HTML-based operation screen of the second application in a state in which neither the second application nor the first application are installed onto the data processing apparatus; and interpreting an API, the API being offered by the server when an instruction to execute data processing is given via the operation screen displayed on the display, the API to be used by the second application such that the main body executes data processing as instructed in the state in which neither the second application nor the first application are installed onto the data processing apparatus, and controlling the main body to execute data processing corresponding to the API by making a call to the main body in the state in which neither the second application nor the first application are installed onto the data processing apparatus, wherein the second application includes at least one function that is the same as or similar to a function of the first application, whereby the data processing apparatus is capable of executing said at least one function without installing either of the first application or the second application, by execution of the data processing corresponding to the API used by the second application which is stored in the server.

30. The non-transitory computer-readable recording medium according to claim 29, wherein the at least one function is the same as a function of the first application, whereby the second application enables the function of the first application.

31. The non-transitory computer-readable recording medium according to claim 29, wherein the server records how the second application is used by the data processing apparatus, as monitoring information, and wherein the program is executable by the computer to control the computer to perform further functions comprising:

receiving the monitoring information from the server when the data processing apparatus installs the first application, wherein the monitoring information is inherited for the first application installed on the data processing apparatus.

32. A non-transitory computer-readable recording medium storing a program that is executable by a processor of a server, the server storing a first application and a second application, wherein the first application is to be used by the data processing apparatus after being installed onto the data processing apparatus, and the second application corresponds to the first application, the program being executable by the processor to control the processor to perform functions comprising:

connecting to the data processing apparatus;

making a display of the data processing apparatus display an HTML-based operation screen of the second application, the operation screen being available from the server being connected to the data processing apparatus; and offering an API when an instruction to execute data processing is given via the operation screen displayed on the display of the data processing apparatus, the API to be used by the second application such that the data processing apparatus executes data processing as instructed in the state in which neither the second application nor the first application are installed onto the data processing apparatus, wherein the second application includes at least one function that is the same as or similar to a function of the first application, whereby the data processing apparatus is capable of executing said at least one function without installing either of the first application or the second application, by execution of the data processing corresponding to the API used by the second application which is stored in the server.

33. The non-transitory computer-readable recording medium according to claim 32, wherein the at least one function is the same as a function of the first application, whereby the second application enables the function of the first application.

34. The non-transitory computer-readable recording medium according to claim 32, wherein the program controls the processor to perform further functions comprising:

recording how the second application is used by the data processing apparatus, as monitoring information; and providing the monitoring information to the data processing apparatus when the data processing apparatus installs the first application, wherein the monitoring information is inherited by the data processing apparatus for the first application installed on the data processing apparatus.

* * * * *